United States Patent [19]

Brooks et al.

[11] 4,403,061

[45] Sep. 6, 1983

[54] INJECTION MOLDABLE AMIDE-IMIDE POLYMERS AND COPOLYMERS CONTAINING METAL OXIDES CAPABLE OF FORMING HYDRATES STABLE AT TEMPERATURES IN EXCESS OF 500° F.

[75] Inventors: Gary T. Brooks, Naperville; Ronald E. Bockrath, Oswego, both of Ill.

[73] Assignee: Standard Oil Company (Indiana), Chicago, Ill.

[21] Appl. No.: 393,470

[22] Filed: Jun. 29, 1982

[51] Int. Cl.[3] ............................................ C08L 79/08
[52] U.S. Cl. .................................. 524/433; 524/405; 524/413; 524/430; 524/431
[58] Field of Search ............... 524/433, 430, 431, 405, 524/413, 600

[56] References Cited

U.S. PATENT DOCUMENTS 3,689,464  9/1972  Holub et al. ..................... 524/600
3,749,304  7/1973  Stephens ......................... 524/600
3,781,240  12/1973 Lubowitz ......................... 524/430
3,951,902  4/1976  Jones et al. ..................... 524/433

FOREIGN PATENT DOCUMENTS 4634 10/1979 European Pat. Off. ............ 524/405

Primary Examiner—Lewis T. Jacobs
Attorney, Agent, or Firm—Gunar J. Blumberg; William T. McClain; William H. Magidson

[57]        ABSTRACT

Injection moldable amide-imide homopolymers and copolymers containing metal oxides capable of forming hydrates stable at temperatures in excess of 500° F. These amide-imides are useful in engineering plastics applications.

18 Claims, No Drawings

INJECTION MOLDABLE AMIDE-IMIDE POLYMERS AND COPOLYMERS CONTAINING METAL OXIDES CAPABLE OF FORMING HYDRATES STABLE AT TEMPERATURES IN EXCESS OF 500° F.

BACKGROUND OF THE INVENTION

1. Field of the Invention

The field of this invention relates to polyamide-imide polymers comprising metal oxides, such as calcium oxide, magnesium oxide, aluminum oxide, iron (III) oxide, sodium tetraborate, strontium oxide, zirconium oxide, to molding powders and molded articles prepared therefrom and to a process for reducing the cure time for polyamide-imide polymers by adding about 0.1 to about 10 weight percent metal oxides or other suitable materials which form hydrates stable at temperatures in excess of 500° F.

BACKGROUND

Amide-imide polymers and copolymers are a relatively new class of organic compounds known for their solubility in nitrogen containing solvents when in the largely polyamide form. In the past the major application of these amide-imide polymers has been as wire enamels. This is illustrated in U.S. Pat. Nos. 3,661,832 (1972), 3,494,890 (1970) and 3,347,828 (1967). Amide-imide polymers and copolymers have also been found useful for molding applications as shown in U.S. Pat. Nos. 4,016,140 (1977); 3,573,260 (1971); 4,224,214 (1980); 4,136,085 (1979); and 4,313,868 (1982). All are incorporated herein by references. These polyamide-imides are known for their outstanding mechanical properties, but they need long cure times to prevent voids from occurring in the polyamide-imide molded parts. This cure time can take several weeks and contributes to the high cost of the polyamide-imide molded objects. This difficulty has been overcome by the present invention wherein metal oxides such as calcium oxide, magnesium oxide, aluminum oxide, iron (III) oxide, sodium tetraborate, strontium oxide, zirconium oxide, or a mixture of these is used to eliminate or reduce the cure time required for these polymers. It is essential that an additive not impair the excellent mechanical properties of the polyamide-imide polymers and copolymers, particularly the flexural and heat deflection properties. The ideal curing agent for these polymers would be one which plasticizes the polymers during injection molding and cross-links the polymers and copolymers during curing or annealing so that the plasticizing effect would be neutralized by cross-linking.

The general object of this invention is to provide polyamide-imide polymers and copolymers comprising calcium oxide, magnesium oxide, aluminum oxide, iron (III) oxide, sodium tetraborate, strontium oxide, zirconium oxide, or a mixture of these or other material which form hydrates at temperatures above 500° F. A more specific object of this invention is to provide polyamide-imide polymers and copolymers suitable for use as engineering plastics particularly for use in injection molding wherein the cure time is reduced or eliminated by the addition of about 0.1 to 10 percent by weight of calcium oxide, magnesium oxide or a mixture of both. Above 10 percent the CaO or MgO act as a filler as well as a fast curing agent. Other objects appear hereinafter.

We have now found that amide-imide polymers and copolymers obtained by reacting a polycarboxylic acid anhydride with the one or a mixture of primary diamines containing 0.1 to 10 percent of magnesium oxide, or calcium oxide, aluminum oxide, iron (III) oxide, sodium tetraborate, strontium oxide, zirconium oxide, can be quickly cured and can readily be injection molded to provide engineering plastics with excellent properties but which can be produced at a much faster rate since the cure time has been substantially eliminated or simply reduced when compared to the polymers which do not contain the calcium oxide or the other materials listed. The calcium oxide or magnesium oxide stabilized polymer of this invention are prepared by reacting an acyl halide derivative of an aromatic tricarboxylic-acid-anhydride with one or a mixture of largely- or wholly-aromatic primary diamines. The resulting products are polyamides wherein the linking groups are predominantly amide groups, although some may be imide groups, and wherein the structure contains free carboxylic acid groups which are capable of further reaction. Such polyamides are moderate molecular weight (7–13,000 as prepared) polymeric compounds having in their molecule units of:

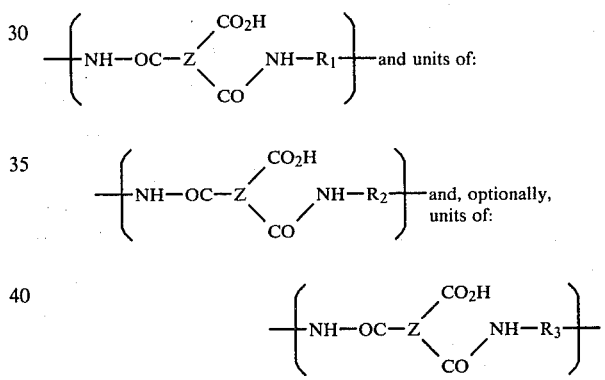

wherein the free carboxyl groups are ortho to one amide group, Z is an aromatic moiety containing 1 to 4 benzene rings or lower-alkyl-substituted benzene rings, $R_1$, $R_2$ and $R_3$ are the same for homopolymers and are different for copolymers and are divalent wholly- or largely-aromatic hydrocarbon radicals. These hydrocarbon radicals may be a divalent aromatic hydrocarbon radical of from 6 to about 10 carbon atoms, or two divalent aromatic hydrocarbon radicals each of from 6 to about 10 carbon atoms joined directly or by stable linkages such as -O-, methylene, -CO-, -SO₂-, -S-; for example, -R'-O-R'-, -R'-CH₂-R'-, -R'-CO-R'-, -R'-SO₂-R'- and -R'-S-R'-.

Said polyamides are capable of substantially complete imidization by heating by which they form the polyamide-imide structure having to a substantial extent reoccurring units of:

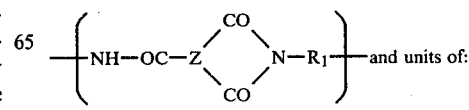

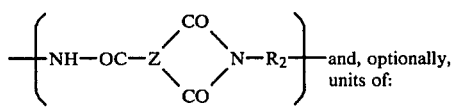

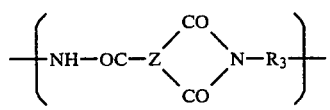

wherein one carbonyl group is meta to and one carbonyl group is para to each amide group and wherein Z, $R_1$, $R_2$ and $R_3$ are defined as above. Typical copolymers of this invention have up to about 50 percent imidization prior to heat treatment, typically about 10 to about 40 percent.

The polyamide-imide copolymers are prepared from an anhydride-containing substance and a mixture of wholly- or partially-aromatic primary diamines. Usually the anhydride-containing substance is an acyl halide derivative of the anhydride of an aromatic tricarboxylic acid which contains 1 to 4 benzene or lower-alkyl-substituted benzene rings and wherein two of the carboxyl groups are ortho to one another. More preferably, the anhydride-containing substance is an acyl halide derivative of an acid anhydride having a single benzene or lower alkyl substituted benzene ring, and most preferably, the substance is the acyl chloride derivative of trimellitic acid anhydride (4-TMAC).

We can use a single diamine but usually the mixture of diamines contains two or more, preferably two or three, wholly- or largely-aromatic primary diamines. More particularly, they are wholly- or largely-aromatic primary diamines containing from 6 to about 10 carbon atoms or wholly- or largely-aromatic primary diamines composed of two divalent aromatic moieties of from 6 to about 10 carbon atoms, each moiety containing one primary amine group, and the moieties are linked directly or through, for example, a bridging -O-, -S-, -SO$_2$-, -CO-, or methylene group. When three diamines are used they are preferably selected from the class composed of:

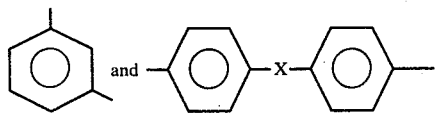

said X being an -O-, -CH$_2$-, or -SO$_2$- group. More preferably, the mixture of aromatic primary diamines is in the one component or two-component and is composed of meta-phenylenediamine and p,p'-oxybis(aniline) and meta-phenylenediamine, or p,p'-sulfonylbis(aniline) and p,p'-methylenebis(aniline). Most preferably, the mixture of primary aromatic diamines contains meta-phenylenediamine and p,p'-oxybis(aniline). In the one component system the preferred diamines are oxybis(aniline) or meta-phenylene diamine. The aromatic nature of the diamines provides the excellent thermal properties of the homopolymer and/or copolymers while the primary amine groups permit the desired imide rings and amide linkages to be formed.

Usually the polymerization or copolymerization is carried out in the presence of a nitrogen containing organic polar solvent such as N-methylpyrrolidone (NMP), N,N-dimethylformamide and N,N-dimethylacetamide. The reaction should be carried out under substantially anhydrous conditions and at a temperature below about 150° C. Most advantageously, the reaction is carried out from about 20° to about 50° C.

The reaction time is not critical and depends primarily on the reaction temperature. It may vary from about 1 to about 24 hours, with about 2 to 4 hours at about 30° to 50° C. preferred for the nitrogen-containing solvents.

In a suitable manner 0.1 to 10 percent by weight of CaO, MgO or a mixture of both is blended with amide-imide homopolymer or copolymer. It has been found that calcium oxide is the preferred hydrate precursor; however, other hydrate precursors such as magnesium oxide, aluminum oxide, iron (III) oxide, sodium tetraborate, strontium oxide, zirconium oxide and other hydrate precursors which are stable at temperatures above amide-imide end use temperatures may also be used.

The polyamide-imide polymers are condensation products of trimellitic anhydride and various aromatic diamines which when polymerized forms a poly (amide-imide) polymer and water. Like all condensation polymers, amide-imide (A-I) resins must be dried prior to processing; however, during plastication, post polymerization can occur resulting in additional H$_2$O to be liberated from the polymer. This moisture can cause problems during molding and cure and must be removed from the part without affecting its shape. To protect the molded part integrity, prolonged cure times are required. When the cure times are shortened, internal foaming occurs resulting in an undesirable dimensional change in the final part as well as internal voids. Foaming can also occur during post curing, thus elaborate post cure cycles are required, especially in thick wall parts. Some of these post cure cycles are as long as 30-40 days with sequential temperature increments from 300° F. to 500° F.

The injection moldable amorphous random linear polyamide-imide polymers may comprise units of

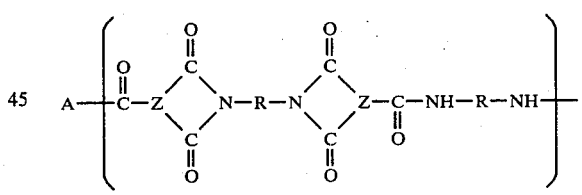

and units of:

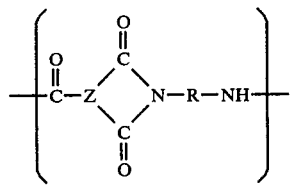

R comprises $R_1$ and $R_2$, $R_1$ and $R_2$ are aromatic hydrocarbon radicals of from 6 to about 20 carbon atoms or two divalent hydrocarbon radicals of from 6 to 20 carbon atoms joined directly or by stable linkages selected from the group consisting of -O-, methylene, -CO-, -SO$_2$-, and -S- radicals and wherein said $R_1$ and $R_2$ containing units run from about 10 mole percent $R_1$ containing unit and about 90 mole percent $R_2$ containing unit to about 90 mole percent $R_1$ containing unit and about 10 mole percent $R_2$ containing unit and include Unit C of the following formula:

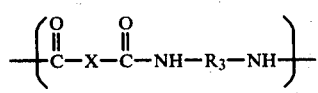

wherein X is a divalent aromatic radical usually a divalent benzene radical and $R_3$ comprises both $R_1$ and $R_2$ as defined above or is equal to $R_1$. Furthermore, if structure C is present R of structural Units A and B can be equal to $R_1$ or comprise both $R_1$ and $R_2$ as set forth above. In the foregoing structural units, Z is the trivalent radical discussed above.

Post curing is necessary in A-I resins to enhance the glass transition temperature (Tg) and thus properties by imidizing the molded part at 500° F. while possibly increasing its molecular weight. The lower temperatures are necessary to liberate the internal moisture from the A-I part without causing cracking or foaming while raising its Tg.

If an A-I part is thermally shocked at 500° F., distortion and/or catastrophic fractures can occur due to the internal pressures generated from the super heated steam on the brittle uncured A-I matrix. This is dependent on the part thickness and the amount of $H_2O$ generated during fabrication. The addition of CaO or MgO eliminates or minimizes these internal pressures by tying up the residual $H_2O$ by chemically reacting with it to form calcium hydroxide [$Ca(OH_2)$] or magnesium hydroxide [$Mg(OH)_2$], which are stable hydrates up to 1076° F. and 662° F., respectively. The addition of CaO or MgO may also act as an accelerator during plastication, thus driving the condensation reaction toward completion. This would explain the rapid rise in melt viscosity during plastication and the increase in Tg of the molded parts. The increase in Tg (500° F. or above) of the as molded CaO, MgO or mixtures of both with amide-imide parts, is important since stress relaxation is minimized at the thermal shock, 500° F., temperature. Amide-imide parts are cured at 500° F. to build properties by imidizing the polymer. We are uncertain of the amide-imide/CaO mechanism, but feel some increase in molecular weight is occurring during plastication.

We have found that the amide-imide homopolymers and copolymers are improved by the addition of reinforcing material particularly the mechanical properties of the polyamide-imides are improved if these copolyamide-imides contain from about 20 to 60 percent by weight glass fibers, glass beads, industrial materials such as talc, or graphite or mixtures thereof. In the preferred range the polyimides contain 30 to 40 percent by weight of the glass fibers, glass beads, talc or graphite or mixtures thereof. Suitably reinforcing materials can be glass fibers, glass beads, glass spheres, or glass fabrics. The glass fibers are made of alkali-free boron-silicate glass or alkali containing C-glass. The thickness of the fiber is suitably on the average between 0.003 mm and 0.03 mm. It is possible to use both long fiber with average lengths of from 1.5 to 15 mm and also short fibers of an average filament length from 0.05 to 5 mm. In principle, any standard commercial-grade fibers especially glass fibers may be used. Glass beads ranging from 0.005 mm to 0.8 mm in diameter may also be used as a reinforcing material.

The reinforced polyamide-imide homopolymers and copolymers may be prepared in various ways. For example, so-called roving endless glass fiber strands are coated with the polyamic acid melt and subsequently granulated. The cut fibers or the glass beads may also be mixed with granulated polyamic acid and the resulting mixture melted in a conventional extruder, or alternatively the fibers may be directly introduced into the polyamic acid melt through a suitable inlet in the extruder. Injection molding of the unfilled or glass-filled copolyamide-imides accomplished by injecting the copolyamide-imides into a mold maintained at a temperature of about 350° F. to 450° F. In this process a 15 to 30 second cycle is used with a barrel temperature of about 580° to 640° F. The injection molding conditions are given in Table 1.

TABLE 1

| | |
|---|---|
| Mold Temperature | 350 to 450° F. |
| Injection Pressure | 17,000 to 23,000 psi and held for 3 to 7 seconds |
| Back Pressure | 100 to 500 psi |
| Cycle Time | 15 to 30 seconds |
| Extruder: | |
| Nozzle Temperature | 610 to 650° F. |
| Barrels: | |
| Front Heated to | 580° F. to 640° F. |
| Screw Speed | 20 to 50 revolutions/minute |

The mechanical properties of the unfilled amide-imide copolymers containing calcium oxide and magnesium oxide and also the filled amide-imide copolymers are given in Tables 2, 3 and 4 and it shows that these homopolymers and copolymers have excellent mechanical and thermal properties despite the fact that they contain 1 to 5 percent by weight of calcium oxide or magnesium oxide.

The following examples illustrate the preferred embodiment of the invention. It will be understood that the examples are for illustrative purposes only and do not purport to be wholly definitive with respect to conditions or scope of the invention.

EXAMPLE I

A 690 gram portion of dimethylacetamide (DMAC) was stirred and cooled to 5° C. with dry nitrogen purging to keep the system dry. An intimate mixture composed of 252.2 grams of 4-TMAC, 119.0 grams of p,p'-methylenebis(aniline) (MBA), and 120.0 grams of p,p'-oxybis(aniline) (OBA) was then added to the solvent over a period of 30 minutes. The temperature of the reaction was allowed to rise to 50° C. At that temperature it was controlled by means of an ice bath. An additional 100 grams of DMAC was then added to wash in all solids, and the reaction continued for another 3½ hours at 50° C. The reaction solution was then poured into a large excess of rapidly-agitated water, whereupon precipitation of the copolymer took place. The solids were then washed several times with distilled water and soaked overnight. Finally, the solids were dried at 120° F. A 443 gram yield of the copolymer was obtained.

EXAMPLE II

A solution consisting of 533.3 grams of NMP, 300 grams of DMAC, and 58.0 grams of propylene oxide was stirred and cooled to 8° C. A mixture of 168.5 grams of 4-TMAC, 80.1 grams of OBA, and 79.3 grams of MBA was then added to the solvent over a period of 50 minutes. During this time the reaction was allowed to warm to 36° C. An additional 66.7 grams of NMP was added to wash in all solids, then the reaction mixture was heated to 50° C. and held at that temperature for 3½ hours. The solution was then filtered.

EXAMPLE III

The general procedure for preparing a copolymer containing three diamines is illustrated by the reaction of OBA, MPDA and MBA and 4-TMAC in DMAC. Thus, a 242.0 gram portion of OBA (1.21 moles), a 130.7 gram portion of MPDA (1.21 moles) and a 239.6 gram portion of MBA (1.21 moles) were dissolved in 3,900 grams of DMAC contained in a 6 liter flask equipped with a nitrogen purge, stirrer, addition funnel and thermometer. A 765 gram portion of 4-TMAC (3.63 moles) in flake or lump form was then added to the solution in portions over 90 minutes. The reaction exotherm was allowed to raise the temperature to about 35° C. The reaction temperature was maintained at 33°–38° C. for the remainder of the 4-TMAC addition using cooling water when necessary. After the TMAC addition was completed, any residual TMAC clinging to the addition funnel was completely washed into the reaction solution with 70 grams of DMAC. A heating mantle was applied to the reaction flask and the temperature quickly raised (about 20 min.) to 50° C. The reaction solution was stirred at 50° C. for 90 minutes and then the solution precipitated by admixing with water. Prior to precipitation the solution viscosity was about 7.5 stokes (25° C., 20 percent solids). The polymer was precipitated in distilled water in a model D, W. J. Fitzpatrick Company, comminuting machine (Fitz mill). After precipitation the polymer was washed with distilled water to aqueous pH 4 to 5 (3 to 4 hours washing time), then filtered onto large Buchner funnels. The polymer was dried overnight by drawing air through the funnels, then finally dried in an aeromat drier at 30°–35° C. for 12–15 hours.

EXAMPLE IV

A 78 gram amount of the copolymer in powdered form made according to the procedure set forth in Example I was heated at 550° F. for about 1 hour. It was then cooled and charged cold into a mold preheated in the press to about 600° to about 650° F. A maximum pressure of 4,200 psi was applied over a 25 minute period and thereafter the mold and contents cooled to 500° F. under a pressure of 2,100 p.s.i. and the molded item immediately ejected. A disk measuring 5½ inches in diameter and ⅛ inch thick had been formed.

EXAMPLE V

A 200 ml. round bottom 4-neck flask, equipped with a nitrogen inlet tube, stirrer, thermometer, and solids addition funnel, was charged with 99.9 parts by weight of (pbw) p,p'-oxybis(aniline) (OBA), 23.1 pbw meta-phenylenediamine (MPDA) and 604 pbw N-methylpyrrolidone (NMP). When solution at room temperature (72° F.) was complete, 150 pbw 4-trimellitoyl anhydride chloride (4-TMAC), having a percent purity of 99.5 percent ±0.5 percent as determined from chloride content, was added over 2.5 hours while maintaining a solution temperature of between about 77°–95° F. When addition was complete the solution was stirred for 3 hours during which time the solution viscosity increased to a Gardner—Hold value of Z5+ or about 110 poises.

Solid polymer was obtained by first pouring the viscous solution into twice its volume of distilled water in a Waring blender and then filtering. The filtrate is washed with 5 increments of 3000 pbw each of distilled water to remove hydrogen chloride that had been generated during reaction.

The solid was dried under a vacuum of 20 inches of mercury for 24 hours at 122° F.

EXAMPLE VI

A 10 gal. glass-lined Pfaudler kettle equipped with a water-cooled jacket and nitrogen inlet was charged with 9.87 lbs. of m-phenylenediamine, 0.35 lbs. of trimellitic anhydride, and 59.2 lbs. of N-methylpyrrolidone. After solution had occurred under a nitrogen purge, an intimate blend of 9.52 lbs. of 4-trimellitoyl anhydride chloride and 9.17 lbs. of isophthaloyl dichloride was added over 2.5 hrs. keeping the temperature below 35° C. The resulting viscous solution was brought to 50° C. When the Gardner viscosity had reached a Z3 viscosity, the solution was precipitated by passage through a Fitzpatrick comminuting mill. The polymer product was washed five times with deionized water followed by air-drying on a filter for 3 days. The product was then brought to a solid content of 98.3 percent by heating in a forced air oven for 2 hrs. at 470° F.

EXAMPLE VII

Significantly faster mold and post cure times were seen when chemically pure CaO was blended with an amide-imide resin and molded on a 500 ton Natco injection molder in a 1¼" by 2½" rotor blank mold. Prior to fabrication the amide-imide material was dried in a desiccant oven at 300° F. for 16 hours. The calcium hydrate lime was calcined at 1400° F. for 3 hours and one mole of water was lost or approximately 24 percent by weight of the $Ca(OH)_2$ was driven off during the calcining.

Five percent by weight of CaO was dry blended with the amide-imide resin prior to molding. Molding conditions were first optimized with the amide-imide control in which a minimum cure time of 360 seconds was required to produce an acceptable part. If cure times were reduced, foaming occurred resulting in an unacceptable change in part dimension. See Table 5 for molding conditions for Example V.

Example V with 5 percent CaO added to the amide-imide resin gave a significant reduction in cure time, from 360 seconds to 200 seconds. During plastication, a rise in melt viscosity occurred with Example V resulting in short shots. To compensate for the increase in viscosity, the accumulator boost time was increased from 0.30 seconds to 0.64 seconds to produce acceptable parts. The 0.34 second increase in boost time is negligible compared to the total cycle time. The reduction in cure time is believed to be due to the reaction of CaO with $H_2O$ to form a hydrate, $Ca(OH)_2$, which is thermally stable up to 1076° F. By chemically binding up the residual water, part foaming can be reduced which yields faster cure times without affecting the molded part integrity.

Another possible explanation for the CaO/amide-imide mechanism is that the CaO is reacting with the amide-imide to form an organo-metal matrix (salt). This could explain the higher melt viscosity during molding and the increase in Tg of the molded part by increasing the molecular weight.

Rotor blanks molded from Example V, with and without 5% CaO, were X-rayed for cracks and voids. Two rotor blanks prepared from Example V, one with 5% CaO and one without CaO, were maintained overnight at room temperature and then thermally shocked at 500° F. in a Blue M forced air oven. The parts without CaO shattered in half, while the CaO/amide-imide rotor blank showed no signs of distortion after 24 hours. The X-ray of the amide-imide/CaO rotor blank was similar before and after curing at 500° F. This is a significant advance in the art since amide-imide parts with or without fillers can require weeks of curing at temperatures below 500° F. to prevent cracking and foaming. The rotor blank used in the study, a 1¼" thick by 2½" diameter part, would require several weeks of curing before it could be exposed to 500° F. without distorting. This prolonged cure step is very expensive and its reduction is a much desired goal.

EXAMPLE VIII

Calcium Oxide Preparation

The chemically pure calcium hydrate lime is calcined at 1400° F. for approximately three hours and then stored in a vacuum sealed container. During calcining, 24 percent by weight of the hydrate lime $Ca(OH)_2$ is lost, which is equal to ~ one mole of $H_2O$. The CaO can be blended with dried or undried amide-imide resins prior to molding and does not have to undergo a compounding step.

CaO Effect on Amide-Imide Tg

It has been found that calcium oxide significantly enhances the as molded (uncured) Tg of an amide-imide and that the enhancement increases with increasing amounts of CaO. Once cured, the CaO amide-imide samples had similar to higher Tg's when compared to the unmodified amide-imide control. The addition of 5 percent $Ca(OH)_2$ had no effect on enhancing the as molded Tg of an amide-imide and it was approximately 30° F. lower than its 5 percent CaO counterpart. This increase in Tg (above 500° F.) of the as molded CaO samples is important since stress relaxation is minimized at the thermal shock 500° F. temperature. This increase in Tg may be due to an increase in molecular weight during molding, formation of a salt and/or due to the reduction of internal part moisture.

A 38° F. rise in Tg occurred after the amide-imide control was cured for 7 days while only a 13°-20° F. rise occurred with the CaO samples; (depending on CaO concentration) however, the cured Tg's were similar. The $Ca(OH)_2$ sample Tg rose 32° F. after curing for 7 days. This decrease in the CaO Δ Tg's (cured-uncured) is important since shorter cure times at 500° F. may be possible without affecting end use properties. This decrease in Δ Tg may indicate that CaO is reacting with the amide-imide to increase the as molded part molecular weight, thus reducing the amount of imidization that occurs during post curing. See Table 2 for results.

Molding Characteristics

It has been demonstrated that CaO significantly reduces the flow of amide-imide during molding as exemplified by its drop in cavity pressure (Table 6). As expected, an increase in CaO concentration decreases the flow characteristics of amide-imide while the addition of $Ca(OH)_2$ had a positive effect on amide-imide viscosity properties. This eliminates the theory that the addition of CaO acts as a filler increasing the melt viscosity of amide-imide. As stated earlier, we believe the rise in melt viscosity is due to an increase in reactivity of the amide-imide chains when in the presence of CaO, resulting in a higher molecular weight product during molding.

The reactivity of CaO with amide-imide under fabrication conditions is time dependent, thus its flow characteristics are a function of its cycle time (residence time). It is believed the addition of CaO accelerates the amide-imide polymer molecular weight, thus explaining its rapid response to cycle time. The responses were so rapid that a cycle time vs. cavity pressure graph could not be drawn; however, the speed was dependent on the amount of CaO added. For example, the 5 percent CaO sample had to be purged after every 5th shot to prevent short shooting while the 3 percent CaO sample was purged after every 10th shot to guarantee adequate part packing. The 3 percent CaO cavity pressures dropped from approximately 10,000 to 0 psi during this period. The 1 percent CaO sample ran the best and had a 10,700 psi cavity pressure while the amide-imide control had a cavity pressure of 15,400 psi. The addition of 5 percent Polysulfone Udel P1700 improved the 5 percent CaO amide-imide flow while reducing its reactivity in that purging was necessary after every 15th shot during which cavity pressures dropped from 10,000 to 0 psi.

All of the samples were run on the 10 oz. Stokes under standard amide-imide quality control (QC) conditions. See Table 7 for molding conditions. It must be remembered that the 10 oz. Stokes is not equipped with an accumulator which would allow for faster and easier filling even with the more viscous CaO samples. During a standard Q.C. evaluation, only approximately 10 percent of the shot is used, thus the melt is subjected to a much longer heat history than normal. With the amide-imide/CaO samples, faster cure cycles can be achieved, thus the viscosity build-up, due to long residence times, may not be a severe problem in production tools.

Shrinkage Stability: Thermal Shock at 500° F. for 3 Days

In an effort to determine the shelf life of uncured amide-imide/CaO samples, 2 tensile bars of each material were left exposed for approximately 30 days then thermally shocked at 500° F. As expected, the amide-imide control and the 5 percent $Ca(OH)_2$ samples distorted and turned dark brown while shrinking approximately seven times more than a similarly conditioned 3 percent CaO sample. The 5 percent CaO sample shrank even less, and had thermal shock shrinkage values lower than the 7 day cured amide-imide control. Overall, shrinkage after thermal shocking at 500° F. is regulated by the amount of CaO added. We found a 2 percent and 3 percent CaO sample had similar shrinkage values to the above 5 percent CaO samples; however, these materials were aged only several days prior to thermal shocking at 500° F.

Thermal shock occurs when the residual volatiles ($H_2O$) exert enough internal pressure on a part to cause it to distort, crack, shatter or foam during an abrupt thermal excursion under atmospheric conditions. All of the thermally shocked samples were equilibrated at room temperature and then shocked at 500° F. for 24 hours.

Shrinkage Stability: 7 Day Cure (320° F., 400° F., 450° F., 475° F., 500° F., 500° F., 500° F.)

The shrinkage characteristics of the 7 day cured samples indicate that the amide-imide/CaO materials had approximately ½ the shrinkage of the amide-imide control. After molding, the shrinkage values were similar between materials, thus the overall shrinkage of the CaO samples were less than the amide-imide material. This is exemplified in Table 8 where total shrinkage decreased as CaO concentration increased. It must be remembered that these samples were aged approximately 30 days prior to curing. The weight loss after 3 days of cure was regulated by the amount of CaO added, in that as CaO increased, weight loss decreased. This may be an indication of the absorption effect of CaO in that it ties up the residual moisture during fabrication, thus reducing the amount of $H_2O$ that liberates during curing. See Table 4 for more information and Table 8 for the shrinkage and weight loss data.

An interesting observation was that the $Ca(OH)_2$ samples were chocolate brown after curing 7 days with the CaO materials were still light green/brown, similar to uncured amide-imide polymer. This might indicate that less oxidation occurred during curing with the CaO materials. This observation is interesting since if the CaO reacts only with the $H_2O$ during fabrication, then the as molded CaO parts should have been identical to the molded $Ca(OH)_2$ parts. Since the cured parts were different in color, we feel the CaO is not solely reacting with the chemically liberated $H_2O$, but possible with the amide-imide to form an organo-metal matrix (salt). Overall, the 7 day cured CaO samples (with colors similar to uncured amide-imide polymer) were more asthetic than the $Ca(OH)_2$ parts.

Physical Properties: 3 Day Cure (Thermal Shock)

The 3 day thermally shocked CaO/amide-imide samples had slightly lower tensile and flexural properties, but higher izod impact values while HDT properties were similar to the 7 day cured counterparts. Due to the sample quantity, only the 1 percent and 3 percent CaO samples were thermally shocked at 500° F. prior to testing. See Table 9 for results.

COMPARATIVE EXAMPLE

EXAMPLE IX

Two other hydrate precursors beside CaO and MgO were evaluated for their fast curing amide-imide copolymer properties as judged by their molding and thermal shock characteristics. The hydrate precursors studied were Iron oxide and Sodium tetraborate, which were dry blended with an amide-imide prior to molding.

Two calcium oxide samples were also evaluated at 2 percent and 3 percent levels and all materials were molded on the 5 oz. Stokes in the rotor blank moled ($1\frac{1}{4}''$ thick by $2\frac{1}{2}''$ diameter). Prior to molding, the hydrate precursors were calcined and then stored in vacuum sealed cans. During calcining, fusion of the sodium tetraborate decahydrate occurred, thus ball milling was necessary to form a useable powder. The calcium hydroxide and iron oxide hydrate powders were free flowing after calcining. The amide-imide control was prepared by the process given in Example V. Listed below are the materials evaluated in their molding order:
Material
1. Amide-Imide Control
2. Control+3% $Ca(OH)_2$
3. Control+3% CaO
4. Control+2% CaO
5. Control+3% $Fe_2O_3$
6. Control+3% $Na_2B_4O_7$ Molding Results A 50 percent increase in amide-imide molding cycle occurred with the 3 percent iron oxide and 3 percent sodium tetraborate samples. These materials produced glassy parts which had a multitude of small micro-voids characteristic of a high flow (wet) amide-imide resin. Cracking was also evident in these parts, most of which were visable with the naked eye perpendicular to the sprue gate. The $Ca(OH)_2$ parts were very glassy and shattered during ejection while its cycle time was approximately 30 percent longer than the control as determined by post blowing.

The 2 percent and 3 percent calcium oxide samples cycled approximately 300 percent faster (60–90 seconds) than the amide-imide control (210 seconds) as judged by the distortion in the molded-in center slot. Cycle times as low as 15 seconds were seen with the 3 percent CaO sample; however, an indentation occurred in the slot which is common with a more viscous amide-imide material. This may have been prevented by increasing hold time and/or secondary injection pressure. A 10 percent increase in injection pressure and a 0.02 second increase in boost time was necessary with the CaO materials to produce acceptable parts. This increase in viscosity was expected; however, it was to a much lesser degree than earlier CaO evaluations. This may be due to the difference in residence times between evaluations thus subjecting the melts to different heat histories. In this program, approximately 80 percent of the shot size was used (less heat history) which is unlike earlier evaluations which used only 10–50 percent. The 3 percent CaO parts had the least amount of voids as determined by x-ray analysis while the 2 percent CaO parts had fewer voids than the amide-imide control.

Thermal Shock

All of the samples were thermally shocked at 500° F. except for the $Ca(OH)_2$ parts since they were already fractured after molding. After an hour at 500° F., the amide-imide control bushings cracked in half, unlike the CaO samples which showed no signs of distortion after 24 hours at 500° F. This was confirmed by x-ray analysis. The iron oxide and sodium tetraborate parts were cracked during molding and showed no further signs of distortion during thermal shocking. These cracks can, however, minimize much of the internal pressure generated by the super heat steam during thermal shocking by aiding in the migration of the volatiles from the part.

The 3 percent iron oxide and 3 percent sodium tetraborate samples were not as effective as CaO or MgO as fast curing amide-imide candidates. A 300+ percent decrease in cycle time occurred with the 2 percent and 3 percent CaO samples when they were molded into $1\frac{1}{4}''$ thick rotor blank parts. The amide-imide control had molding cycles of $3\frac{1}{2}$ minutes, while the 3 percent CaO samples had a 60 second cycle. All parts were thermally shocked and no distortion occurred with the CaO samples, unlike the amide-imide control, which cracked in half after an hour at 500° F. The 3 percent CaO samples also had fewer voids than the control, before and after thermal shocking. Table 10 below gives the physical properties of thermal shock versus the seven day cure cycle.

TABLE 2

| | | | |
|---|---|---|---|
| $Ca(OH)_2$ Content (%) | | 0 | 0 |
| CaO Content (%) | | 0 | 1 |
| MgO Content (%) | | 0 | 0 |
| Injection Molding Temperatures, °F. | | 630 | 630 |
| As Molded Properties | ASTM Method | | |
| Tensile Strength, psi | D-1708 | 13,000 | — |
| Tensile Elongation, % | D-1708 | 3.74 | — |
| Flexural Strength, psi | D-790 | 16,900 | — |
| Flexural Modulus, psi | D-790 | 720,000 | — |
| HDT at 264 psi, °F. | D-48 | 465 | — |
| Izod Impact, Ft.-lbs./ | | | |

TABLE 2-continued

| | | | |
|---|---|---|---|
| in. of notch | D-256 | 0.67 | — |
| Annealed Properties | | | |
| Tensile Strength, psi | D-1708 | 26,000 | 27,800 |
| Tensile Elongation, % | D-1708 | 16.3 | 15.9 |
| Flexural Strength, psi | D-790 | 32,900 | 35,200 |
| Flexural Modulus, psi | D-790 | 672,000 | 769,000 |
| HDT at 264 psi, °F. | D-48 | 531 | 531 |
| Izod Impact, Ft.-lbs./ in. of notch | D-256 | 3.00 | 1.81 |
| Density, g/cc | D-1505 | 1.41 | — |
| Annealed Properties at 400° F. | | | |
| Flexural Modulus, psi | | 508,000 | — |
| % R.T. Retention | | 76 | — |
| Flexural Strength, psi | | 19,100 | — |
| % R.T. Retention | | 58 | — |
| Glass Transition Temperatures | | | |
| Tg as molded, °F. | | 496 | 513 |
| Tg annealed, °F. | | 534 | 531 |
| Ca(OH)₂ Content (%) | | 0 | 0 | 0 |
| CaO Content (%) | | 2 | 0 | 3 |
| MgO Content (%) | | 0 | 2 | 0 |
| Injection Molding Temperatures, °F. | | 630 | 630 | 630 |
| As Molded Properties | | | | |
| Tensile Strength, psi | | 10,700 | — | 11,200 |
| Tensile Elongation, % | | 2.56 | — | 2.67 |
| Flexural Strength, psi | | 17,800 | — | 16,700 |
| Flexural Modulus, psi | | 783,000 | — | 796,000 |
| HDT at 264 psi, °F. | | 486 | — | 484 |
| Izod Impact, Ft.-lbs./ in. of notch | | 0.73 | — | 0.54 |
| Annealed Properties | | | | |
| Tensile Strength, psi | | 24,000 | 23,700 | 23,300 |
| Tensile Elongation, % | | 12.2 | 11.2 | 11.5 |
| Flexural Strength, psi | | 31,400 | 27,200 | 35,300 |
| Flexural Modulus, psi | | 759,000 | 740,000 | 756,000 |
| HDT at 264 psi, °F. | | 542 | 546 | 540 |
| Izod Impact, Ft.-lbs./ in. of notch | | 1.52 | 0.75 | 1.59 |
| Density, g/cc | | 1.43 | — | 1.42 |
| Annealed Properties at 400° F. | | | | |
| Flexural Modulus, psi | | 564,000 | — | 569,000 |
| % R.T. Retention | | 74 | — | 75 |
| Flexural Strength, psi | | 19,400 | — | 19,500 |
| % R.T. Retention | | 62 | — | 55 |
| Glass Transition Temperatures | | | | |
| Tg as molded, °F. | | 522 | — | 521 |
| Tg annealed, °F. | | 538 | — | 541 |
| Ca(OH)₂ Content, % | | 0 | 5 | |
| CaO Content, % | | 5 | 0 | |
| MgO Content, % | | 0 | 0 | |
| Injection Molding Temperatures, °F. | | 630 | 630 | |
| Annealed Properties | | | | |
| Tensile Strength, psi | | 17,600 | 23,200 | |
| Tensile Elongation, % | | 6.6 | 11.9 | |
| Flexural Strength, psi | | 27,600 | 30,500 | |
| Flexural Modulus, psi | | 825,000 | 687,000 | |
| HDT at 264 psi, °F. | | 542 | 541 | |
| Izod Impact, Ft.-lbs./ in of notch | | 1.39 | 1.04 | |
| Glass Transition Temperatures | | | | |
| Tg as molded, °F. | | 525 | 495 | |
| Tg as annealed, °F. | | 538 | 527 | |

TABLE 3

Mechanical Properties, Amide-Imide Copolymers, Unfilled with CaO and Ca(OH)₂

| Days at 500° F. | Control | 3% Ca(OH)₂ | 3% CaO |
|---|---|---|---|
| *Tensile Modulus, psi* | | | |
| Uncured | 729,000 | 602,000 | 864,000 |
| 5 | 727,000 | 684,000 | 829,000 |
| 7 | 602,000 | 584,000 | 700,000 |
| 14 | 601,000 | 665,000 | 753,000 |
| 51 | 646,000 | 605,000 | 751,000 |
| *Tensile Strength, psi* | | | |
| Uncurred | 14,300 | 3,940 | 11,600 |
| 5 | 26,300 | 22,800 | 20,300 |
| 7 | 26,100 | 23,400 | 21,200 |
| 14 | 25,400 | 22,200 | 24,000 |
| 51 | 25,600 | 22,300 | 22,000 |
| *Tensile Elongations, %* | | | |
| Uncured | 5.5 | 1.2 | 3.7 |
| 5 | 18.8 | 13.1 | 8.5 |
| 7 | 20.6 | 15.2 | 10.4 |
| 14 | 19.4 | 12.3 | 11.3 |
| 51 | 18.5 | 15.2 | 11.4 |

*Control-Amide-Imide Lot 109/6

TABLE 4

| | | | |
|---|---|---|---|
| CaO Content, % | | 0 | 2 |
| Glass Content, % | | 30 | 30 |
| Injection Molding Temperature, °F. | | 630 | 630 |
| Annealed Properties | | | |
| Tensile Properties | D-1708 | | |
| Strength, psi | | 25,700 | 23,200 |
| Elongation, % | | 6.6 | 5.5 |
| Flexural Properties | D-790 | | |
| Strength, psi | | 45,800 | 43,200 |
| Modulus, psi | | 1,480,000 | 1,630,000 |
| Izod Impact, Ft.-lbs./ in. of notch | D-256 | 1.9 | 1.4 |
| HDT at 264 psi, °F. | D-48 | 544 | 554 |

TABLE 5

Amide-Imide Rotor Blank Molding Conditions
500 Ton Natco Injection Molder

| | | |
|---|---|---|
| CaO Content, % | 0 | 5 |
| Cylinder Temperature, °F. | | |
| Nozzle | 675 | 675 |
| Front Zone | 675 | 675 |
| Middle Zone | 625 | 625 |
| Rear Zone | 550 | 550 |
| Timers (Seconds) | | |
| Clamp Close | 360 | 200 |
| Injection Hold | 50 | 50 |
| Boost (Inj. Hi) | .30 | .64 |
| Cycle Delay | | |
| Injection Pressure, psi | | |
| High | 30,000 | 30,000 |
| Low | 400 | 400 |
| Machine Settings | | |
| Clamp Pressure, tons | 200 | 200 |
| Injection Rate | Max | Max |
| Screw rpm | 25 | 50 |
| Feed Setting, inches | 3.0 | 4.0 |
| Cushion, inches | ¼" | ¼" |
| Back Pressure, psi | 100 | 50 |
| High Pump | on | on |
| Accumulator | on | on |
| Sprue Break | off | off |
| Mold Temperatures, °F. | | |
| Stationary | 450 | 450 |
| Movable | 450 | 450 |

TABLE 6

CaO Effect on Amide-Imide Flow
Injection Pressure, 18,300 psi

| CaO, % | 0 | 1 | 2 | 3 | 5 | — | — |
|---|---|---|---|---|---|---|---|

TABLE 6-continued

CaO Effect on Amide-Imide Flow
Injection Pressure, 18,300 psi

| | | | | | | | |
|---|---|---|---|---|---|---|---|
| Ca(OH)$_2$, % | — | — | — | — | — | 5 | — |
| MgO, % | — | — | — | — | — | — | 2 |
| Cavity Pressure, psi | 15,400 | 10,700 | 0 | 0 | 0 | 17,000 | 13,900 |

TABLE 7

Typical Amide-Imide 10 oz Stokes I.M.
Q.C. Molding Conditions

| | |
|---|---|
| Cylinder Temperatures, °F. | |
| Nozzle | 630 |
| Front Zone | 630 |
| Middle Zone | 620 |
| Timers, seconds | |
| Clamp Closed (cure) | 18 |
| Injection Hold | 6 |
| Booster (Inj. Hi) | 2 |
| Cycle Delay (open) | 1 |
| Injection Pressure, psi | |
| High | Max ~ 18,500 |
| Low | ~ 2200 |
| Cavity Pressure* | depending on material |
| Machine Setting | |
| Clamp Pressure, psi | 175 ton |
| Injection Rate | Max |
| Screw rpm | 50 |
| Feed Setting | 1" → 2.5" depending on material |
| Cushion | ¼" → ½" |
| Back Pressure, psi | 320 |
| Mold Temperature, °F. | |
| Stationary | 450 |
| Movable | 450 |

*Cavity pressure is measured at the farthest knockout pin in Q.C. mold by placing a pressure transducer behind the pin.

TABLE 8

Amide-Imide Shrinkage Study
Base Material: Amide-Imide Lot JRF-204

| | Shrinkage, % | | | |
|---|---|---|---|---|
| Sample | as Molded % | 3 day* cured at 500° F. % | 7 day cured (320–500° F.) % | Total (Molding +7 day) |
| 5% Ca(OH)$_2$ | 0.30 | 7.05 | 0.23 | 0.53 |
| 1% CaO | 0.23 | 3.72 | 0.40 | 0.63 |
| 3% CaO | 0.23 | 1.00 | 0.37 | 0.60 |
| 5% CaO | 0.30 | .34 | 0.17 | 0.47 |
| 5% CaO + 5% Polysulfone | 0.30 | .40 | 0.37 | 0.67 |
| Lot JRF-204 | 0.23 | 7.72 | 0.70 | 0.93 |

*Thermal shocked: Room Temp. → 500° F.

| | Tg °F. | |
|---|---|---|
| Sample | Molded | Cured 3 day/7 day |
| 5% Ca(OH)$_2$ | 495 | —/527 |
| 1% CaO | 513 | 527/531 |
| 3% CaO | 518 | 532/538 |
| 5% CaO | 525 | —/538 |
| 5% CaO + 5% Polysulfone | 523 | —/536 |
| Lot JRF-204 | 496 | —/534 |

Note:
T-bar measurements: Parts were stored ~ 30 days before curing (average of 2 specimens).

| | WEIGHT LOSS % | |
|---|---|---|
| Sample | 3 Day Cure | 7 Day Cure |
| 5% Ca(OH)$_2$ | 0.82 | 0.82 |
| 1% CaO | 0.57 | 0.65 |
| 3% CaO | 0.35 | 0.49 |
| 5% CaO | 0.09 | 0.18 |
| 5% CaO + 5% Polysulfone | 0.16 | 0.34 |

TABLE 8-continued

Amide-Imide Shrinkage Study
Base Material: Amide-Imide Lot JRF-204

| | | |
|---|---|---|
| Lot JRF-204 | 0.69 | 0.76 |

Note:
T-bars (2): Parts were store ~ 30 days prior to curing.

TABLE 9

Physical Properties Table II
3 Day vs. 7 Day Cure

| | Amide-Imide Lot JRF-204 | | | |
|---|---|---|---|---|
| | 1% CaO | | 3% CaO | |
| | 7 Day | 3 Day | 7 Day | 3 Day |
| Tg (°C./°F.) | 277/531 | 275/527 | 281/538 | 278/532 |
| Physicals | | | | |
| Flexural Strength, psi | 35,200 | 33,800 | 35,500 | 33,500 |
| Flexural Modulus, psi | 769,000 | 702,000 | 806,000 | 761,000 |
| Tensile Strength, psi | 27,800 | 24,800 | 25,900 | 22,900 |
| Izod Impact, Ft.-lbs./in. of notch | 1.81 | 2.17 | 1.59 | 1.94 |
| HDT at 264 psi, °F. | 531 | 533 | 539 | 537 |

3 day cure: Samples were thermally shocked at 500° F. for three days.
7 day cure: Standard cure cycle: 320,400,450,475, 500, 500, 500° F.

TABLE 10

Thermal Shock Cure vs. 7 Day Cure

| | 3 Day (T.S.) | 7 Day |
|---|---|---|
| Calcium Oxide, % | 2 | 2 |
| Physical Properties | | |
| Tensile Strength, psi | 22,200 | 24,000 |
| Tensile Elongation, % | 5.4 | 12.2 |
| Tensile Modulus, psi | 766,000 | 770,000 |
| Flexural Modulus, psi | 775,000 | 759,000 |
| Flexural Strength, psi | 31,400 | 31,400 |
| Izod Impact, Ft.-lbs./in. of notch | 1.29 | 1.52 |
| Density, g/cc | 1.42 | 1.43 |
| Thermal Properties | | |
| HDT at 264 psi, °F. | 533 | 542 |
| Tg, °F. | 541 | 538 |
| Calcium Oxide, % | 3 | 3 |
| Physical Properties | | |
| Tensile Strength, psi | 22,800 | 23,300 |
| Tensile Elongation, % | 7.9 | 11.5 |
| Tensile Modulus, psi | 727,000 | 742,000 |
| Flexural Modulus, psi | 758,000 | 756,000 |
| Flexural Strength, psi | 33,700 | 35,300 |
| Izod Impact, Ft.-lbs./in. of notch | 1.48 | 1.59 |
| Density, g/cc | 1.42 | 1.42 |
| Thermal Properties | | |
| HDT at 264 psi, °F. | 533 | 540 |
| Tg, °F. | 540 | 541 |

Thermal Shock (T.S.): 3 day cure cycle at 500° F.
7 day Cure: Gradual step change, 1 day at 320° F., 400° F., 475° F., 475° F. and 3 days at 500° F.

We claim:

1. A process for reducing the cure time for polyamide-imide polymers derived from trimellitic anhydride and aromatic diamines which process comprises adding about 0.1 to about 10 weight percent of a metal oxide capable of forming a metal hydrate stable at temperatures in excess of 500° F. to the polyamide-imide polymer prior to curing.

2. A process for reducing the cure time for polyamide-imide copolymers derived from trimellitic anhydride, isophthalic acid, terephthalic acid, and aromatic diamines which process comprises adding about 0.1 to about 10 weight percent of a metal oxide capable of forming a metal hydrate stable at temperatures in excess of 500° F. prior to curing.

3. The process of claim 1 wherein the metal oxide is calcium oxide, magnesium oxide or a mixture of both.

4. The process of claim 2 wherein the metal oxide is calcium oxide, magnesium oxide or a mixture of both.

5. As a composition of matter, an injection moldable copolymer blend comprising about 0.1 to 10 percent by weight of metal oxide capable of forming a metal hydrate stable at temperatures in excess of 500° F., said copolymer comprising units of:

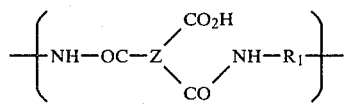

and units of:

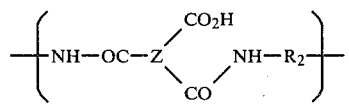

wherein the free carboxyl groups are ortho to one amide group, Z is a trivalent benzene ring or lower-alkyl-substituted trivalent benzene ring, $R_1$ and $R_2$ are the same or are different and are divalent aromatic hydrocarbon radicals of from 6 to about 10 carbon atoms or two divalent aromatic hydrocarbon radicals of from 6 to about 10 carbon atoms joined directly or by stable linkages selected from the group consisting of —O—, methylene, —CO—, —SO$_2$— and —S— radicals and wherein said $R_1$ and $R_2$ containing units run from about 10 mole percent $R_1$ containing unit and about 90 mole percent $R_2$ containing unit to about 90 mole percent $R_1$ containing unit to about 10 mole percent $R_2$ containing unit.

6. The composition of claim 5 wherein the copolymer comprises calcium oxide, magnesium oxide or a mixture of both.

7. As a composition of matter, an injection moldable copolymer blend comprising about 0.1 to 10 percent by weight of a metal oxide capable of forming a metal hydrate stable at temperatures in excess of 500° F. said copolymer comprising units of:

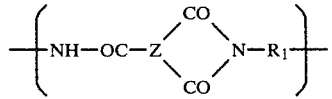

and units of:

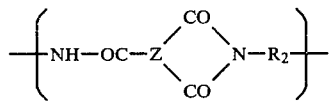

wherein one carbonyl group is meta to and one carbonyl group is para to each amide group and wherein Z is a trivalent benzene ring or lower-alkyl-substituted trivalent benzene ring, $R_1$ and $R_2$ are different and are divalent aromatic hydrocarbon radicals of from 6 to about 10 carbon atoms or two divalent aromatic hydrocarbon radicals of from 6 to about 10 carbon atoms joined directly or by stable linkages selected from the group consisting of —O—, methylene, —CO—, —SO$_2$— and —S— radicals and wherein said $R_1$ and $R_2$ containing units run from about 10 mole percent $R_1$ containing unit and about 90 mole percent $R_2$ containing unit to about 90 mole percent $R_1$ containing unit and about 10 mole percent $R_2$ containing unit.

8. The composition of claim 7 wherein the copolymer comprises calcium oxide, magnesium oxide or a mixture of both.

9. As a composition of matter, an injection moldable copolymer blend comprising about 0.1 to 10 percent by weight of a metal oxide capable of forming a metal hydrate stable at temperatures in excess of 500° F. said copolymer comprising of A units of:

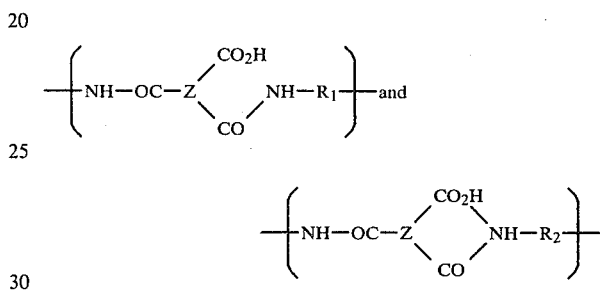

wherein the free carboxyl groups are ortho to one amide group and B units of:

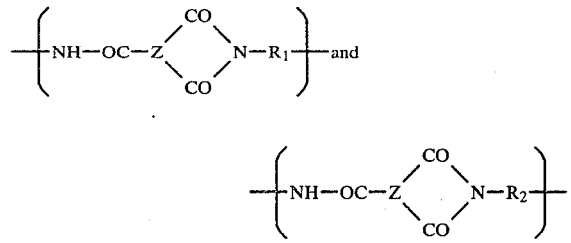

wherein one carbonyl group is meta to and one carbonyl group is para to each amide group and wherein Z is a trivalent benzene ring or lower-alkyl-substituted trivalent benzene ring, $R_1$ and $R_2$ are the same or are different and are divalent aromatic hydrocarbon radicals of from 6 to about 10 carbon atoms or two divalent aromatic hydrocarbon radicals of from 6 to about 10 carbon atoms joined directly or by stable linkages selected from the group consisting of —O—, methylene, —CO—, —SO$_2$— and —S— radicals and wherein the proportions of A and B units run from about 1 mole percent A units and about 99 mole percent B units to about 99 mole percent A units and about 1 mole percent B units and wherein the $R_1$ and $R_2$ containing components of the A and B units run from about 10 mole percent $R_1$ containing components and about 90 mole percent $R_2$ containing components to about 90 mole percent $R_1$ containing components and about 10 mole percent $R_2$ containing components.

10. The copolymer of claim 5 wherein $R_1$ is

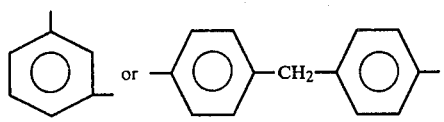

and R₂ is

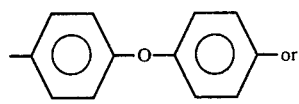 or

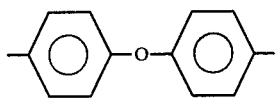

or wherein R₁ is

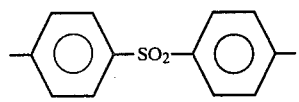

and R₂ is

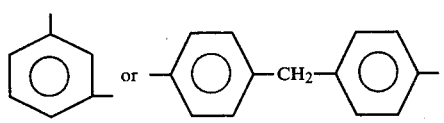

11. The copolymer of claim 7 wherein R₁ is

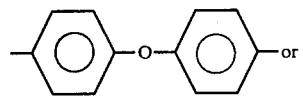

and R₂ is

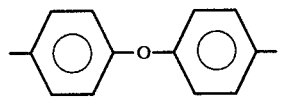 or

or wherein R₁ is

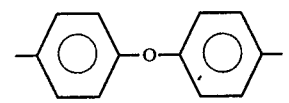

and R₂ is

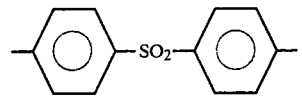

12. The copolymer of claim 9 wherein R₁ is

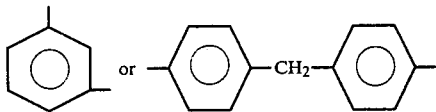

and R₂ is

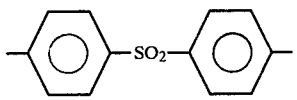 or

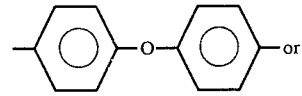

or wherein R₁ is

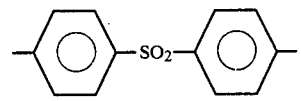

and R₂ is

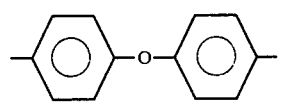

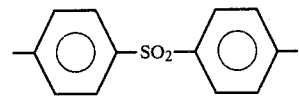

13. The copolymer of claim 5 wherein Z is a trivalent benzene ring, R₁ is

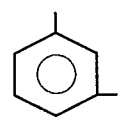

and R₂ is

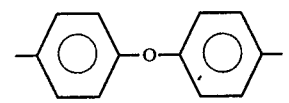

and wherein the concentration range runs from about 30 mole percent of the R₁ containing units and about 70 mole percent of the R₂ containing units to about 70 mole percent of the R₁ containing units and about 30 mole percent of the R₂ containing units.

14. The copolymer of claim 7 wherein Z is a trivalent benzene ring, R₁ is

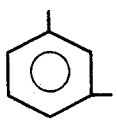

and R₂ is

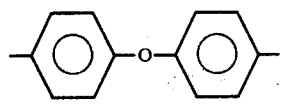

and wherein the concentration range runs from about 30 mole percent of the R₁ containing units and about 70 mole percent of the R₂ containing units to about 70 mole percent of the R₁ containing units and about 30 mole percent of the R₂ containing units.

15. As a composition of matter an injection moldable copolymer blend comprising about 0.1 to about 10 percent by weight of metal oxide capable of forming a stable hydrate at temperatures in excess of 500° F. and a polyamide-imide polymer comprising units of:

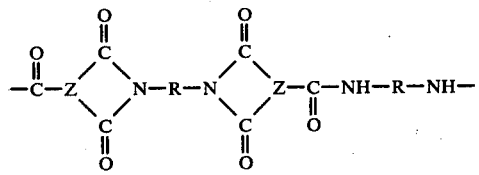

and units of:

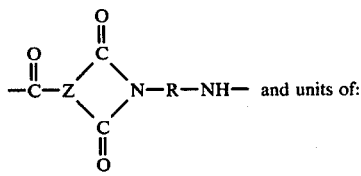

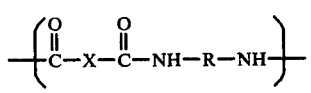

wherein "Z" is a trivalent benzene ring; R comprises R₁ or a mixture of R₁ and R₂, R₁ and R₂ are divalent aliphatic hydrocarbon radicals containing two to sixteen carbon atoms or are aromatic hydrocarbon radicals of from 6 to about 20 carbon atoms or two divalent hydrocarbon radicals of from 6 to 20 carbon atoms joined directly or by stable linkages selected from the group consisting of —O—, methylene, —CO—, —SO₂— and —S— radicals, and said R₁ and R₂ containing units run from about 10 mole percent R₁ containing units and 90 mole percent R₂ containing units to about 90 mole percent R₁ containing units to about 10 mole percent R₂ containing units and X is a divalent aromatic radical.

16. The copolymer of claim 16 wherein X and R₁ are

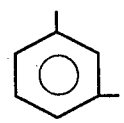

17. An injection moldable blend comprising calcium oxide and magnesium oxide in an amount of about 0.1 to about 10 weight percent, and a polyamide-imide polymer comprising units of:

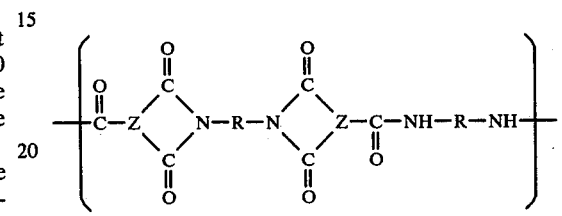

and units of:

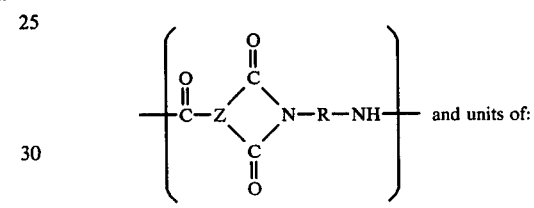

wherein "Z" is a trivalent benzene ring; R comprises R₁ or a mixture of R₁ and R₂, R₁ and R₂ are divalent aliphatic hydrocarbon radicals containing two to sixteen carbon atoms or are aromatic hydrocarbon radicals of from 6 to about 20 carbon atoms or two divalent hydrocarbon radicals of from 6 to 20 carbon atoms joined directly or by stable linkages selected from the group consisting of —O—, methylene, —CO—, —SO₂— and —S— radicals, and said R₁ and R₂ containing units run from about 10 mole percent R₁ containing units and 90 mole percent R₂ containing units to about 90 mole percent R₁ containing units to about 10 mole percent R₂ containing units and X is a divalent aromatic radical.

18. The copolymer of claim 1 wherein X and R₁ are

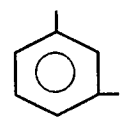

* * * * *

UNITED STATES PATENT OFFICE
CERTIFICATE OF CORRECTION

Patent No. 4,403,061          Dated Sept. 6, 1983

Inventor(s) Gary T. Brooks and Ronald E. Bockrath

It is certified that error appears in the above-identified patent and that said Letters Patent are hereby corrected as shown below:

Patent reads:

| Col. | Line | |
|---|---|---|
| 16 | 6 | "Parts were store" should read --Parts were stored-- |
| 2 | 17 | "of this invention are" should read --of this invention is-- |
| 7 | 64 | "Gardner-Hold" should read --Gardner-Holdt-- |
| 17 | 39 | "unit to about 10" should read --unit and about 10-- |
| 18 | 19 | "comprising of A units" should read --comprising A units of-- |
| 22 | 1 | "claim 16" should read --claim 15-- |
| 22 | 49 | "to about 10" should read --and about 10-- |

Signed and Sealed this

Seventeenth Day of July 1984

[SEAL]

Attest:

GERALD J. MOSSINGHOFF

Attesting Officer     Commissioner of Patents and Trademarks